United States Patent [19]

Workman

[11] 3,871,049
[45] Mar. 18, 1975

[54] WINDOW WIPER ASSEMBLY
[75] Inventor: Robert E. Workman, Westlake, Ohio
[73] Assignee: The B. F. Goodrich Co., New York, N.Y.
[22] Filed: May 17, 1971
[21] Appl. No.: 144,245

Related U.S. Application Data
[63] Continuation of Ser. No. 9,584, Feb. 9, 1970, abandoned.

[52] U.S. Cl.......... 15/250.04, 15/250.1, 15/250.19
[51] Int. Cl. .............................................. B60s 1/46
[58] Field of Search....... 15/250.01, 250.02, 250.03, 15/250.04, 250.06, 250.07, 250.1, 250.19, 103

[56] References Cited
UNITED STATES PATENTS

| | | |
|---|---|---|
| 3,371,368 | 3/1968 | Walker ........................ 15/250.04 |
| 3,431,577 | 3/1969 | Minsky ...................... 15/250.42 X |
| 3,548,440 | 12/1970 | Kothari ............................ 15/250.1 |
| 3,548,441 | 12/1970 | Kruger ............................. 15/250.1 |

Primary Examiner—Peter Feldman
Attorney, Agent, or Firm—Joseph Januszkiewicz

[57] ABSTRACT

A window wiper assembly, especially suitable for cleaning the tailgate window of a station wagon, is mounted inside the tailgate with a resilient rubber wiper element normally retracted from the window. As the window is raised toward its closed position, the wiper element may be distended by fluid pressure to press the wiper against the window. Simultaneously, the fluid is manifolded to sprays which wet the window while it is being wiped by the wiper element.

3 Claims, 3 Drawing Figures

PATENTED MAR 18 1975  3,871,049
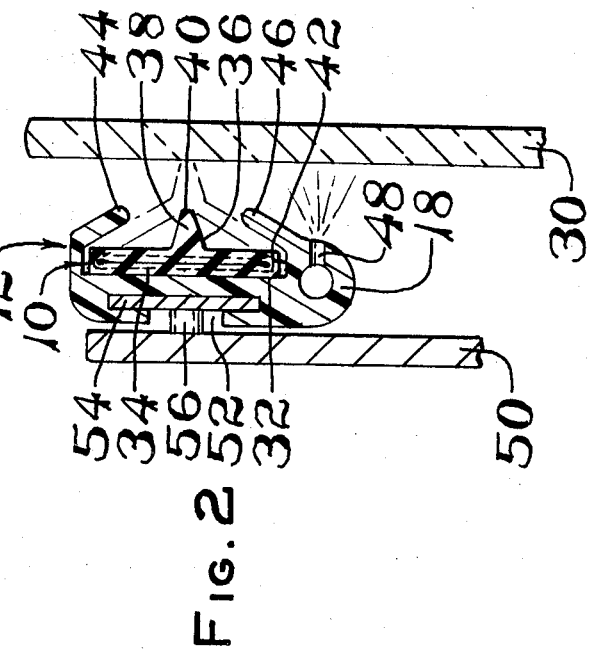
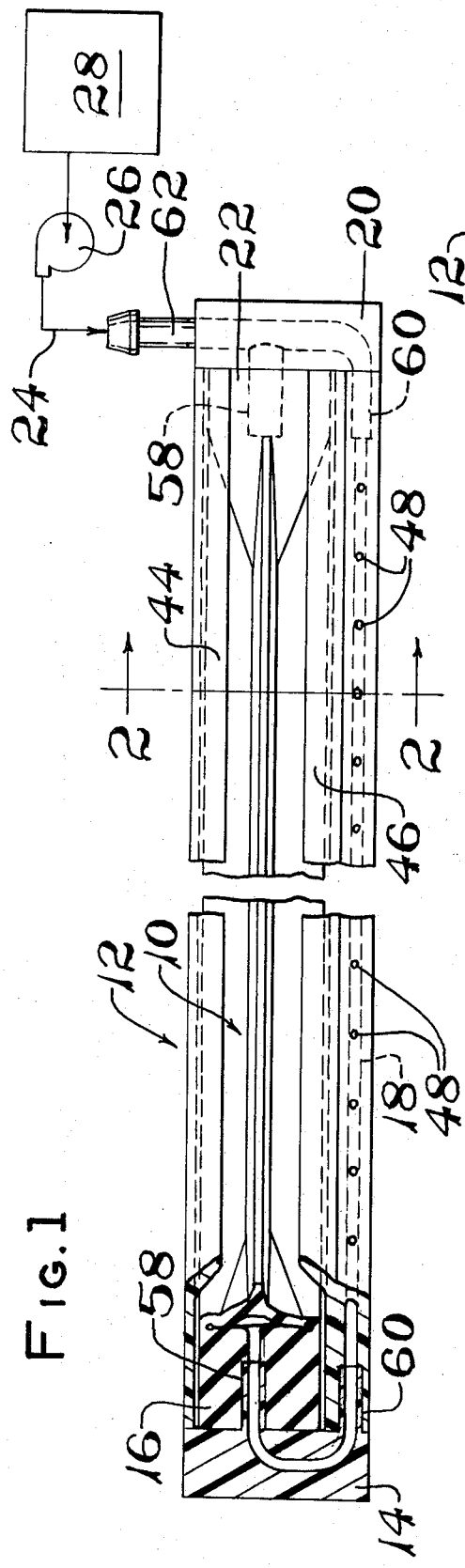
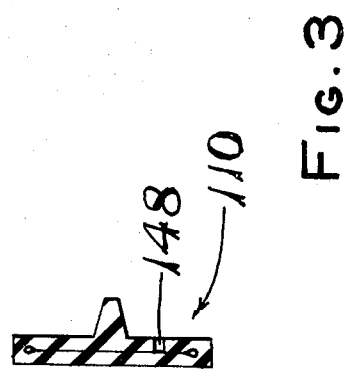
INVENTOR.
ROBERT E. WORKMAN
BY John D. Haney
ATTY.

WINDOW WIPER ASSEMBLY

This is a continuation of application Ser. No. 9,584, filed Feb. 9, 1970, now abandoned.

This invention relates to a window wiper assembly of the class in which the window is mounted for movement relative to the wiper assembly. This assembly is particularly useful for cleaning power operated windows in a motor vehicle such as the remotely operated rear window of a station wagon.

Prior to this invention wiper assemblies of this class have consisted primarily of a wiper blade supported by mechanical spring mechanisms which bias the wiper blade against the associated window. The spring mechanisms have been leaf springs essentially similar to the form of supports commonly used on arcuate swinging wipers of automobile windshields. If washing equipment was used with the prior art wiper assemblies, it was essentially a separate, independent mechanism intened to function concurrently with the wiper as the associated window was moved past the wiper blade. The prior art has also recognized the advantages of selectively engaging and retracting a wiper relative to the window, but the means suggested for this purpose have been complex mechanical linkages which are unreliable, expensive and which are a continuing source of maintenance.

The improved wiper assembly of this invention provides for the selective engagement and disengagement of a wiper bead from its associated window through the use of a simple fluid pressure system. Preferably, a liquid system is used to position the wiper blade so that this same system can also be used as a washing medium. This is accomplished by providing for spraying liquid medium on the window simultaneously with the engagement of the wiper bead with the window. That is, the washing and the wiping function are provided in a single integral assembly.

The wiper bead is retractable by the resiliency of a tubular rubber fabric reinforced body on which the wiper bead is formed. The wiper bead is projected against the window as a result of the distension of the tubular body when the latter is filled with fluid. This same fluid is manifolded to sprays formed in the retainer which supports the wiper element on the adjoining frame in which the assembly is mounted.

A special advantage of this wiper assembly is that it operates as easily with contoured window shapes of either convex or concave curvature as it does with flat windows. However, the wiper assembly can adjust automatically to changing contours on the window. The operation of the wiper assembly is quick and positive when fluid is turned on or off. The wiper does not drag against the window as the latter is moved past the wiper, unless the wiper element is purposely distended by the inflation fluid. A cleaning spray is provided simultaneously with any wiping operation so that the window is protected from being marred or scratched in its travels past the wiper.

The entire wiper assembly, including both the retainer and the wiper element are preferably made of rigid non-metallic material which resists corrosion and does not creak or rattle in an automobile. The design is particularly well suited to the shock and other dynamic forces normally incurred in routine operation of a vehicle and the materials preferably used in the manufacture of these assemblies are well adapted to the extremes of temperature and weather normally incurred in the operation of motor vehicles.

The invention is further described with reference to the accompanying drawings which show one preferred form of this improved washer assembly particularly suited for automobiles.

In the drawings FIG. 1 is a view of the front of the assembly as it would be seen from the position of a window it is to engage;

FIG. 2 shows a cross section of the assembly taken on the line 2—2 of FIG. 1, and additionally shows in chain dotted lines the manner in which the assembly would be installed for operation with the window in an automobile; and FIG. 3 shows a cross section of another form of a resilient wiper element which could be used in the assembly of FIGS. 1 and 2.

Referring to FIG. 1, the principal components of this assembly include a long narrow resilient wiper element 10 supported in a rigid retainer 12. An end cap 14 (at the left end of the assembly as it is viewed in FIG. 1) interconnects the retainer 12 with the adjoining left end 16 of wiper element 10 to prevent the axial displacement of the wiper element from the retainer. End cap 14 also operates as a manifold to communicate inflation fluid between the wiper element 10 and a conduit 18 in the retainer which functions as a washing mechanism, as hereafter more fully explained. An opposing end cap 20 interconnects the right end 22 of the wiper element with the adjoining right end of conduit 18. End cap 20 additionally includes an inlet pipe 24 through which the actuation and washing fluid is communicated from a suitable supply, indicated schematically by a pump 26 and a fluid reservoir 28. The details of the fluid supply are shown schematically because any one of a variety of fluid supply systems well known in the art may be used.

The cross section of the assembly shown in FIG. 2 best shows the details of its construction, and moreover, shows the preferred way in which this wiper assembly is mounted in an automobile for cleaning a window 30. Referring to FIG. 2, the wiper assembly is normally mounted with its lengthwise dimension generally horizontal, in laterally spaced relation to its associated window which is ordinarily in a vertical position. The arrangement shown in FIG. 2 is for illustration only, however; it is possible, of course, to use this assembly with a window mounted in any desired plane. Whatever the plane of the window, the wiper assembly is positioned to extend transverse to the line of travel of the window, so that the wiper element 10 may be projected into engagement with the window as it moves past the assembly.

The wiper element 10 consists of a tubular body 32 composed essentially of rubber material with an internal fabric reinforcement 34. The wiper element 10 is molded and mounted in a flattened coonfiguration approximately like that shown in the full lines in FIG. 2. The fabric reinforcement 34 is embedded in the rubber of the body and serves to stiffen the body 32 laterally to resist being dislodged from the retainer 12. Integral with the body 32 is the wiper bead 36 of soft rubber of generally triangular prismatic shape. The base of the bead is integral with the tubular body 32 and the apex 38 of the bead is directed toward the window 30.

The rubber material for the wiper bead 36 is selected particularly for its abrasion resistance, and is compounded to avoid transfer of the rubber to the glass. The preferred compounds have a Shore A durometer in the range of 30–65; but the actual durometer is not critical to the successful functioning of the assembly. As the durometer of the bead rubber increases, however, the assembly tends to vibrate undesirably and become somewhat less efficient. Preferably the wiper bead 36 is slightly softer than the hardness conventionally used in windshield wiper blades as of 1969. We have also found that the wiper assembly functions best if the apex of the bead 36 terminates in a narrow flat land 40. The bead may terminate in an apex which is rounded or sharp, however, and it will still operate adequately.

The wiper element 10 is supported in the rigid retainer 12 in a channel 42 along the entire side of the retainer directed toward the window 30 (see FIG. 2). This channel is formed by two flanges 44 and 46 extending the length of the retainer and in their width dimension the flanges slope inwardly toward each other overlying the margin's of the tubular body 32 of the wiper element. The width of these flanges, and the angle at which they slope toward each other determines the maximum distension available for the tubular body 32 of the wiper element. If the flanges 44 and 46 are formed in a position more parallel to the tubular body 32 than is shown in FIG. 2, the distension of the body will be more restricted from that shown in the drawing. Conversely, by increasing the slope angle, the distension of the tubular body may be correspondingly increased.

The conduit 18 of the retainer has a series of small holes 48 spaced one from another in the lengthwise direction of the retainer on the side of the retainer directed toward the window. Preferably the holes 48 extend on an angular course through the conduit so that fluid impinges on the glass in a direction other than normal and is better distributed over the surface of the glass.

The retainer 12 may be mounted in any convenient manner on an associated frame structure 50 which in FIG. 2 is shown as one of the door panels housing the window glass 30. In this form of mounting, the retainer includes a T-shaped channel 52 on its rearward side which may be slipped over a thin metal mounting bar 54. The latter in turn is fastened to the frame 50 by a series of studs 56. In lieu of the studs 56, and related mounting parts, the retainer may be simply cemented directly to the door panel 50, or riveted to it.

Each of the end caps 14 and 20 is preferably molded of plastic material similar to that of the retainer. Each end cap includes a pipe 58 (See FIG. 1) which extends inside its respective adjoining end of the tubular body 32 of the wiper element. The ends of the tubular body 32 are preferably stretched over these pipes 58 to form a pressure seal and ordinarily no cement or gaskets are necessary to form a fluid tight connection. Additionally, each end cap has a second pipe 60 which fits tightly into the respective adjoining end of the conduit 18 to provide for communicating fluid at opposite ends of the assembly between the conduit 18 and the body 32 of the wiper assembly. The right end cap 20 additionally includes a pipe 62 for communicating a source of fluid represented schematically in FIG. 1 by pump 26 and reservoir 28.

In service, the wiper element 10 of the assembly is normally in its retracted, collapsed, flattened position as shown in solid lines in FIG. 2. In this position the wiping bead 36 is located away from the window 30 which is mounted for upward vertical movement transverse to the wiping bead 36. Ordinarily under these conditions the tubular body 32 and conduit 18 are empty of fluid.

The wiper assembly is operated while the window 30 is moved vertically relative to the assembly. To actuate the wiper assembly the pump 26 is started (by suitable equipment not shown) so that fluid is delivered through the pipe 62 to the conduit 18 (via pipe 60) and simultaneously to the tubular body 32 of the wiper element. As the fluid is displaced into the tubular body 32, the latter is distended to press the wiper bead 36 against the window 30 approximately as is shown in the dotted lines in FIG. 2. Meanwhile the fluid also fills the conduit 18 and is sprayed through the many small holes 48 directly against the window, immediately below the wiper bead. As the window is thereafter projected upwardly, it is progressively wetted by the fluid spraying from the holes 48 and simultaneously wiped clean by the wiper bead 36.

After the window reaches its upward position, the fluid supply system is shut off (which can be done automatically or manually) so that the fluid in conduit 18 drains through the holes 48. The resilience of the tubular body 32 restores the body to its flattened position, retracting wiper bead 36 and displacing the residual fluid into conduit 18. The communication provided between body 32 and conduit 18 by both end caps 14 and 20 makes both the filling and the emptying of body 32 occur very quickly. FIG. 3 shows a modified form of wiper element 100 in which the wiper element itself includes orifices 148 through which the actuating fluid may be sprayed against the window. The wiper element 110 is in all other respects identical to wiper element 110 of FIG. 2. Wiper element 110 may be substituted in the assembly shown in FIG. 2, in which case the retainer and end caps may be modified to eliminate the spray conduit 18 and pipes 60. Alternatively, element 110 may be used with the retainer 12 of FIG. 2 to augment the quantity of fluid sprayed against the window.

Water or any of the well known automobile window washing liquids may be used in this wiper assembly.

I claim:

1. A window cleaning unit for a window movable into and out of a window well, comprising: a single elongated inflatable member, a squeegee carried on said inflatable member, a fluid dispensing passageway extending longitudinally through said inflatable member, said inflatable member having a plurality of longitudinally spaced spray apertures along the length thereof communicating directly with said passageway, a retainer supporting said inflatable member for projecting outwardly said squeegee upon inflation of said passageway in said inflatable member, and pressurizing means connected to said passageway operative to inflate said inflatable member to project the squeegee from noncontacting engagement into contacting engagement with the window surface to be wetted and cleaned.

2. A window cleaning unit for a window movable into and out of a window well comprising: an elongated inflatable member, a squeegee carried on said inflatable member, said inflatable member having a fluid dispensing passageway therein entending throughout the length thereof, a plurality of spray apertures in said inflatable member communicating directly with said passageway with atmosphere, a retainer supporting said inflatable member in adjacent relationship to a window surface to be cleaned, a reservoir of washer solvent connected to said passageway in said inflatable member, and a pump for pressurizing the washer solvent to pump washer solvent to said passageway to inflate said inflatable member to project said squeegee from noncontacting engagement into contacting engagement with the window surface and for the dispersal of solvent through said spray apertures for wetting said window and wiping the window upon movement past said spray apertures and said squeegee respectively.

3. A window wiper assembly comprising a tubular flexible resilient member; said resilient member having a pair of flat sides, a rigid retainer for supporting said tubular member; said rigid retainer having side flanges directed outwardly toward each other to define a channel for holding said resilient member and limiting the outward movement of said resilient member upon distension; said resilient member having a window-engaging wiping bead along one side of said resilient member; means for mounting said retainer in fixed relation to an associated window; said flat resilient member having a single passageway extending therethrough; a plurality of spray apertures in said inflatable member located to one side of said bead and within said side flanges communicating said passageway with atmosphere; means for communicating a fluid medium with said passageway for distending said body and projecting said wiping bead from noncontacting engagement into contacting engagement with an associated window while simultaneously directing a portion of such fluid medium against such associated window through said apertures.

* * * * *